United States Patent [19]
Klein

[11] 3,898,760
[45] *Aug. 12, 1975

[54] HOOK CONNECTOR

[76] Inventor: Gerald B. Klein, 13451 Stuart Ct., Broomfield, Colo. 80020

[ * ] Notice: The portion of the term of this patent subsequent to Feb. 27, 1990, has been disclaimed.

[22] Filed: Feb. 23, 1973

[21] Appl. No.: 335,081

Related U.S. Application Data

[63] Continuation-in-part of Ser. No. 128,015, March 25, 1971, Pat. No. 3,717,907, and a continuation-in-part of Ser. No. 274,307, July 24, 1972.

[52] U.S. Cl. ............................................... 43/44.83
[51] Int. Cl. ............................................ A01k 91/04
[58] Field of Search.............. 43/44.83, 44.86, 44.9, 43/43.16

[56] References Cited
UNITED STATES PATENTS

| | | | |
|---|---|---|---|
| 2,865,131 | 12/1958 | Ellis | 43/43.16 |
| 3,066,372 | 12/1962 | Parker | 43/44.83 |
| 3,210,883 | 10/1965 | Ulsh | 43/44.83 |
| 3,460,285 | 8/1969 | Perkins | 43/44.9 |

Primary Examiner—Warner H. Camp
Attorney, Agent, or Firm—Van Valkenburgh, Lowe & Law

[57] ABSTRACT

A hook connector for connecting a snell, line or leader to the shank of a hook. The connector is formed as a resilient member of a tough, hard, synthetic resin such as nylon.

4 Claims, 39 Drawing Figures

PATENTED AUG 12 1975 3,898,760

SHEET 4

HOOK CONNECTOR

This invention is a continuation-in-part of my applications for a Leader With Connector filed Mar. 25, 1971, Ser. No. 128,015, which has now matured into Pat. No. 3,717,907, and for a Leader Connector filed July 24, 1972, Ser. No. 274,307, since the subject matter disclosed in the present application is related to the subject matter of these former applications.

This invention relates to the attachment of fishhooks to snells, leaders or lines, and more particularly to a connector at the shank end of a fishhook for the attachment of a snell, line or leader thereto. As such, the invention will be hereinafter called a "hook connector". The invention will be described as connecting the fishhook to a snell. However, it is to be understood that the invention may also be used with lines or leaders since snells, lines and leaders are connected to fishhooks in the same manner.

A hook connector may be used with hooks for bait fishing and also for artificial lures such as flies and the like. Conventionally, a hook for such purposes is formed with an eye at its shank end. The end of a snell is threaded through this eye and then tied upon the shank of the hook. The knots used for this purpose must be double-looped and the tying of such knots requires both skill and time. Special knots are necessary since the nylon strands commonly used for snells, lines and leaders are very slippery when wetted and when tied with ordinary knots, they will slip loose from a hook, usually when a good fish is caught.

Thus, a major expense in the manufacture of fishhooks with the snells attached is the labor involved in properly tying the snells onto the fishhooks, and in tying the snells onto small artificial flies. On the other hand, where a fisherman ties his own snells, or leaders, onto his hooks or flies, he must carefully tie a proper knot onto the hook to prevent the snell, or leader, from slipping when it is wet. This requires a high degree of skill and patience, and can become difficult, especially when a fisherman is not in a well lit shelter, but is along a bank or in a boat and when the weather conditions are not the best.

Accordingly, there is a real and definite need for an improved and simplified mode of connecting a snell onto a hook. Such a need is clearly apparent in production lines of a hook manufacturing company where labor costs are constantly increasing. Also, an easier mode of connecting a snell onto a hook has long been needed in the field for the many fisherman who prefer to tie hooks onto their snells, lines or leaders at the time they are to be used. The present invention was conceived and developed with such considerations in view and the invention comprises, in essence, a small connector of a strong but resilient material such as nylon, having one end affixed to the shank of a hook and having the other end adapted for connection with a snell.

It follows that a primary object of the invention is to provide a novel and improved hook connector which permits a line or a snell to be neatly and securely attached to the hook.

Another object of the invention is to provide a novel and improved hook connector for securing a snell onto the shank of a hook, which is a small, neat-appearing member snugly embracing the hook shank and which may be even smaller than the eye of a hook and thus especially suitable for threading bait such as worms upon the hook and upon the snell or leader beyond the hook.

Another object of the invention is to provide a novel and improved hook connector which permits a snell to be connected thereto by a simple reliable knotting operation to make the same cheaper for industrial operations and much easier for fishermen who tie the hooks to their own tackle.

Another object of the invention is to provide a novel and improved hook connector which permits a hook to be quickly and easily tied to a line or a leader with comparatively simple knots to make the entire procedure easier for fishermen and when desired, to eliminate short snells completely.

Another object of the invention is to provide a novel and improved hook connector which holds the knot of a snell connecting therewith in a resilient, yieldable seat and which also may be connected to the hook in a manner which provides a favorable distribution of stress at the connection and without contacting the metal hook to better protect the snell against sudden jerks.

Another object of the invention is to provide a novel and improved hook connector for a fish hook which may be angled at any selected direction to more effectively direct the point of a hook and help secure the same in the mouth of a fish.

Other objects of the invention are to provide a novel and improved hook connector for a fishhook which is simple, strong, economical and versatile, and requires only a minimum of skill to use.

With the foregoing and other objects in view, my present invention comprises certain constructions, combinations and arrangements of parts and elements as hereinafter described, defined in the appended claims, and illustrated in preferred embodiment by the accompanying drawing in which:

Figures 1, 2, 3, 6:
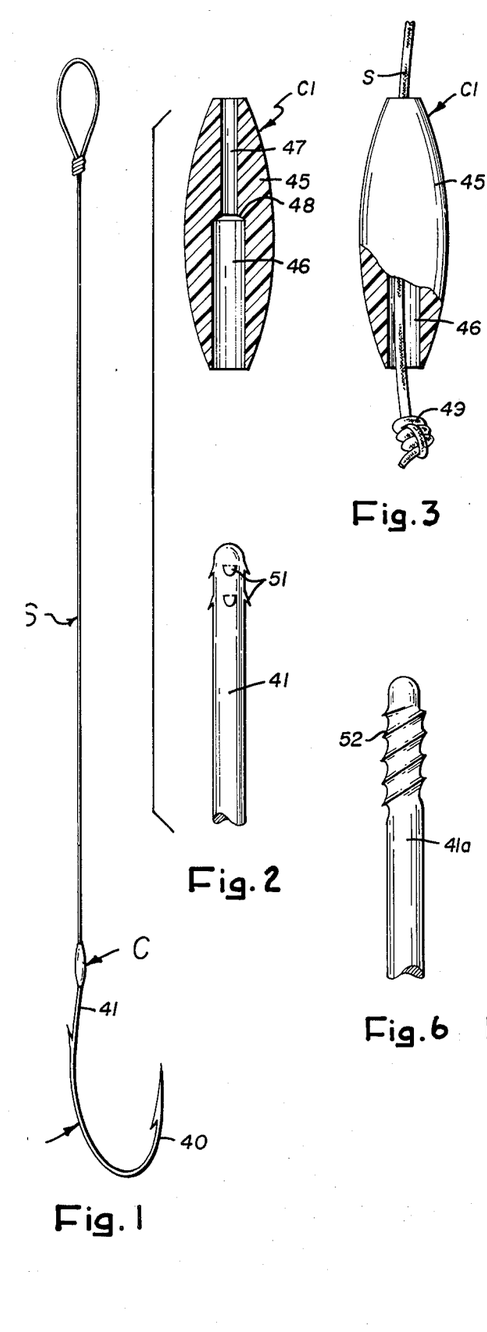
FIG. 1 illustrates a fishhook having a snell secured to it by the improved hook connector.
FIG. 2 is an exploded view showing the connection, in section, and the end portion of a hook shank modified to fit in the connector.
FIGS. 3 and 4 and 5 illustrate sequential steps in attaching the end of a snell to the connector and thereafter attaching the connector to the shank of a hook.
FIG. 6 shows the end portion of a hook shank which is modified by providing screw threads to facilitate securing it into a connector.

Referring more particularly to the drawing, FIG. 1 exemplifies a hook H connected to a snell S by an improved connector C. The hook H is formed as a curved barbed point 40 on a shank 41. This shank is essentially a wire or rod of uniform diameter bent to the shape of a hook with hook barbs being formed on it. The snell S is a short strand of nylon or silk gut having one end knotted to form a connective eye. Such a snelled hook may be attached to the end of a line or attached to a leader at the end of a line. Many lines and leaders are of the same material as the snell and it is also a common practice to attach a hook directly to the end of a line or leader as heretofore mentioned.

A first embodiment of the connector C1 is shown at FIGS. 2–5, a construction where the snell is smaller in diameter than the hook shank. This connector is formed as a small, elongate body 45 which may be cigar-shaped as shown, or more nearly cylindrical. This body is essentially symmetrical about its longitudinal axis. It is formed of nylon or a similar strong, resilient material and it may be reinforced with fiberglass or the like. This connector will ordinarily be manufactured by injection molding processes as an economical, low-cost operation. The body has a diameter which need not be many times greater than the diameter of a hook shank 41. The drawings show the diameter of the body as being approximately three times the hook shank diameter but this diameter may be much less, and the same will depend to a great extent upon the strength and rigidity of the material forming the connector. In any event, this diameter does not greatly exceed the diameter of the hook shank.

Figure 4:
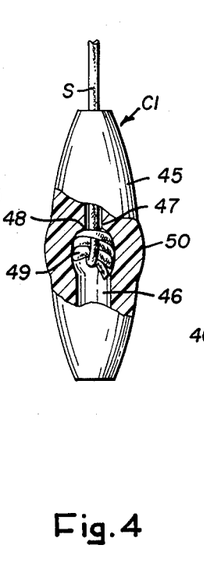

An axial passageway extends through this body 45 with a larger diameter portion 46 at one end and a smaller diameter portion 47 at the other end, and these portions meet at a shoulder 48 within the body. The larger diameter portion 46 forms a socket to receive the end of the hook shank and thus, this portion will be hereinafter called a "shank socket 46". The smaller diameter portion 47 provides a passageway through which the snell S may be threaded with only a small clearance about the snell and thus, this portion will be hereinafter called a "snell passageway 47". In using this embodiment shown at FIGS. 2–5, the diameter of a hook shank 41 will be somewhat larger than the snell S but will not differ greatly in diameter. Thus, when the shank socket 46 in the connector is proportioned to receive a hook shank, it will also be large enough to permit the end of a snell S to be extended through the snell passageway 47 and thence, through the socket 46. A knot 49 is then tied at the end of the snell S as shown at FIG. 3. The snell is then drawn back to pull the knot 49 into the shank socket 46 to abut against the shoulder 48 within the body and thereby secure the snell to the connector with a tight fit, as shown at FIG. 4.

The knot 49 may be specially tied and in a manner which will prevent the snell from slipping and untying whenever the snell is pulled. Ordinarily, in a conventionally tied hook, a simple overhand knot and a figure-8 knot are unsatisfactory and instead, special knots must be used to tie the snell to a hook. Both nylon and silk gut snells or leaders are very slippery, especially when they are wet. This requirement for a specially tied knot may not be necessary in the connector C1, or in the other connectors hereinafter described, provided that the diameter of the knot 49 is such that it will fit tightly into the socket 46. With a tight fit, even a simple overhand knot will not slip and untie. Thus, a tight fit of the knot in the socket is the preferred mode of securing the snell knot 49 in the socket 49. The type of knot to be tied will depend upon the comparative diameters of the shank socket 46 and of the snell strand S. A clinch knot 49, such as shown in the drawing, may be required; however, if the diameter of the socket 46 is only slightly larger than the diameter of the snell S, as shown, a more simple knot, such as a figure-8 knot, may be used. It is obvious that any skilled individual can tie an appropriate knot in the snell, and it is contemplated that a definite pull will be required to seat this knot against the shoulder 48. In so seating the knot, the resilient body 45 of the connector will expand slightly to tightly grip the knot 49 in the embrace of the socket 46, and such expansion is diagrammatically shown as a bulge 50 at FIGS. 4 and 5. If the knot 49 fits loosely in the socket 46, it is essential that a slip-proof knot be used, and also, some means must be provided to hold the knots in place in certain of the constructions hereinafter described. In any event, when the knot is against the seat and held by the resilient connector, the possibility of the knot cutting itself as from a sudden jerk is greatly reduced. The use of a resilient material in the connector also prevents the knot or line from being cut by the connector.

A tight fit is definitely preferred in this knotted connection of the snell to the connector. Some variations of structure are possible to better effect this tight fit of the knot within the socket 46. For example, the socket 46 may be tapered slightly or the diameter of the socket 36 may be reduced adjacent to the shoulder 48 as by a step-like change or, in any suitable manner not shown.

Figure 5:
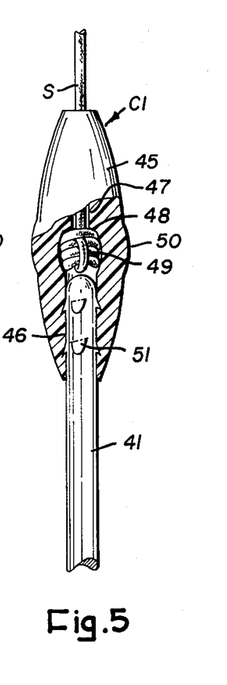

It is essential that the end of the hook shank 41 fit tightly in the socket 46 and resist a substantial pull. The shank may be thrust, or otherwise fitted, into this socket 36 after the snell S is knotted and the knot 49 is pulled in place against the seat 48 as shown at FIG. 5. Accordingly, the socket 46 may be slightly smaller than the diameter of the hook shank 41 so that it will stretch to produce a desirable, tight fit. It was found that the natural grab effect between the shank and the connector fitted in this manner, would be adequate to hold the snell onto the end of a hook and in tests the snell would often break before the connector C1 would slip off the hook shank.

However, it was found desirable to provide a more positive holding action by the connection between the hook shank 41 and the connector C1, and holding means were provided, such for example, as the barbs 51 on the shank 41 shown at FIGS. 2 and 5. These barbs are slanted away from the end of the hook to permit the shank to be easily inserted into the socket 46 as shown at FIG. 5, but to prevent its withdrawal. Tests demonstrated that the force required to pull the hook from the socket was substantially increased, to the point where the nylon connectors would sometimes pull apart instead of releasing from the hook shank and in every instance, the force to pull the connector from the hook shank exceeded the strength of a snell.

Figure 7:
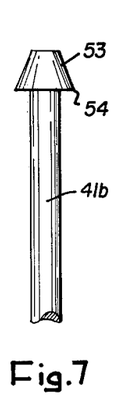
FIG. 7 shows the end portion of a hook shank, which has a frusto-conical knob at its end.
Figure 8:
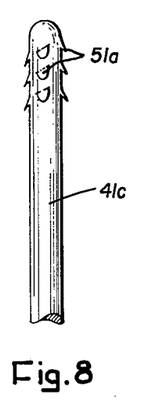
FIG. 8 shows the end portion of a hook shank which is similar to FIG. 6, but with barbs in a thread-forming array.

Other modes of securing a hook shank into a socket are possible. For example, the connector may be welded to the shank by heat, solvents, cement or ultrasonic action. Instead of being straight, it may be undulated, serrated or stepped to more tightly fit into a connector socket. FIGS. 6, 7 and 8 show a few alternate forms of a holding means on a hook shank to fit in the connector socket 46. The hook shank 41a, shown at FIG. 6, provides for a thread 52 so that the end of the shank may be turned into the connector, with the threads cutting or embossing a threaded reach within the socket. To effectuate a tight fit, the outer diameter of the threads is greater than the diameter of the socket 46 while the root diameter of the threads is substantially the same, to be snugly embraced by the socket.

The hook shank 41b shown at FIG. 7 provides for an enlarged head 53, which is shown as the frustum of a cone with an overhanging base portion to provide a gripping edge 54. It is to be noted that a hook shank with a head as large as that shown at FIG. 7 may be fitted most effectively by molding a connector in place upon the hook in which case a different type of connector will be needed from that shown at FIGS. 2–5, such as hereinafter further described. If this shank 41b with the head 53, is to be thrust into the socket 46 of the FIG. 2 unit, it is contemplated that a mechanical device will be required for the purpose. However, if the head is comparatively smaller than that shown at FIG. 7, it may be thrust into the socket manually.

The hook shank 41c shown at FIG. 8 provides for an array of barbs 51a, similar to the barbs 51, shown at FIG. 2, but with the barbs being arranged in a helical pattern so that the shank 41c may be turned into the socket 46 in a manner similar to the threaded construction shown at FIG. 6. In this construction, the barbs 51a will cut a thread-like slit in the connector socket 46 and the resulting fit of the shank 41c and connector will be very secure.

Figures 9, 10, 11, 12, 13, 14, 15, 16, 17:
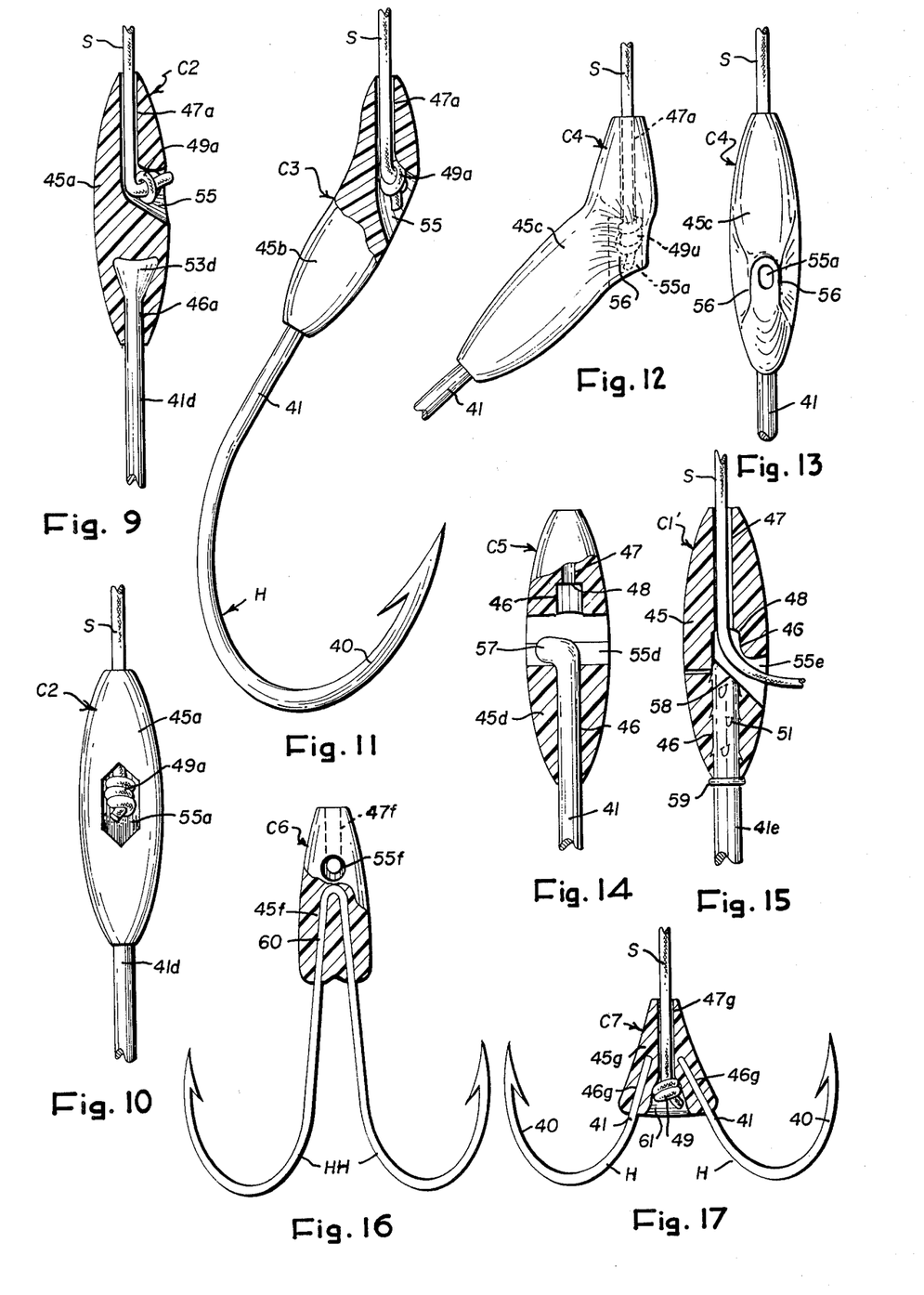
FIG. 9 is a sectional view of a first modified construction, of a hook connector securing a snell to a hook shank, and exemplifying a construction which has substantially the same structure as that shown at FIG. 9 of my previous application, Ser. No. 128,015.
FIG. 10 is a side view of a hook connector shown at FIG. 9, but with an elongated hexagonal socket.
FIG. 11 shows a second modified construction of a hook connector similar to the construction shown at FIG. 9, but with the body being angled to orient the hook at an inclination with respect to the snell attached thereto.
FIG. 12 shows a third modified construction of a hook connector similar to that of FIG. 11, but with a flattened socket and with the end of the snell and the passageway through the connector being shown in dotted lines.
FIG. 13 is an edge view of the structure shown at FIG. 12.
FIG. 14 shows a fourth modified construction of a hook connector which is partly in section and is similar to the structure of a connector shown at FIG. 4 of my former application, Ser. No. 274,307, but with the shank of a hook fitted therein and secured by bending the end of the shank into a side opening of the connector.
FIG. 15 is a sectional view of a fifth modified construction of a hook connector where a hook shank has a sloping end cooperating with a side opening to facilitate threading a snell through the passageway and from the side opening of the connector, as shown.
FIG. 16 is a view, partially in section, of a sixth modified construction of a hook connector to hold a double hook.
FIG. 17 is a sectional view of a seventh modified construction of a hook connector to hold two individual hooks.

The connector C1, shown at FIGS. 2 to 5, is constructed to require insertion of the hook shank 41 into the socket 46. In contrast, a connector C2, the first modified embodiment shown at FIGS. 9 and 10, is preferably molded upon a hook shank 41d. The shank 41d has an enlarged head 53d at its end. The snell passageway 47a terminates at a side opening socket 55 near the center of the connector, wherein the knotted end 49a of a snell S is fitted with a tight, snug fit. This mode of forming a connector C2 upon a hook shank is analogous to forming a connector upon a fly line or upon a leader which was disclosed in my prior applications.

In this construction, the snell S is threaded into the passageway and out the side opening socket 55. Preferably, the base of this socket 55 opposite the passageway 47a is sloped to permit the end of the snell S to be guided out of the socket when it is being fitted into the connector. The end is then knotted, as at 49a and pulled back into the side opening socket 55 which is proportioned to hold the knotted end in place with a tight fit. It is desirable that this knot 49a fit tightly in the socket, with the resilient connector C2 being stretched slightly to effect a desirable tight gripping action. This socket 55 may assume various forms, such as circular, oval or even a distorted hexagonal form 55a as shown at FIG. 10. The connector C2, with a side opening 55 such as shown at FIGS. 9 and 10, and also other connectors with side openings as hereinafter described, are especially suitable for field use since the connectors may be attached to hooks at the factory, but the snells, or lines or leaders, may be attached by a fisherman in the field with little effort.

The connector C3, the second modified embodiment, shown at FIG. 11, is similar to the connector C2, above described. However, the body 45b is curved at its center portion to angle the shank of the hook H with respect to the alignment of the snell as illustrated. The snell passageway 47a and the side opening 55 are essentially the same as heretofore described. This mode of hook alignment is advantageous in using certain types of hooks since it will place the point of the hook more nearly in line with a pull of the snell or leader when the fishing tackle is in use, to better set the hook and hold the fish after it is hooked.

The connector C4, the third modified embodiment, shown at FIGS. 12 and 13, is similar to the connector C3 excepting that a modified side opening is provided, which is formed as a deep narrow socket 55a. A portion of the body 45c is narrowed at this socket-shaped side opening to provide sides 56 to permit stretching of the resilient material forming the connector. Thus, when an end of the snell S is knotted and pulled into this socket-like side opening, the stretching and flexing of the sides 56 will hold the knot 49 with a tight grip.

The body 45d connector C5, the fourth modified embodiment, shown at FIG. 14, is formed similar to the connector C1 with a shank socket 46, a snell passageway 47 and a shoulder 48 as heretofore described. However, this connector C5 includes also, a side passageway 55d which extends completely through the body in the manner of the construction shown at FIG. 4 of my copending application, Ser. No. 274,307. In the presently described unit, however, a hook shank 41 is fitted into the socket 46 to protrude into the side passageway 55d. The end of the shank 41 is then turned to the side of the opening as at 57 to interlock the shank within the connector. The end of the snell S may then be threaded through the passageway 47, into the socket 46 and project from the side opening 55d and it is guided out of the socket by striking the turned, sloping end of the hook shank. This snell end is then knotted and pulled back with the knot fitting into the socket 46 against the seat 48, all as heretofore described. The portion of the socket 46 adjacent to seat 48 may be eliminated and the knot retained in the passageway 55d.

FIG. 15 shows a fifth modified embodiment, but using a connector C1' similar to the connector C1 shown at FIG. 2, excepting that a side opening 55e is provided in the wall of the body 45 at the socket 46, near the shoulder 48. The hook shank 41e is modified from the hook shank 41 shown at FIG. 2 by sloping its end 58 and by providing a stop 59 at the base of the shank portion which is inserted into the connector. This permits the end of the shank to be inserted into the socket 46 to a depth which positions the sloping end 58 at the adjacent wall of the side opening 55e. When properly located, as shown at FIG. 15, the sloping shank end 58 will guide the end of a snell S out of the side opening when it is threaded into the passageway 47. This simplifies the chore of attaching the snell S to the connector, especially by a fisherman in the field.

FIG. 16 shows a sixth modified embodiment of a connector C6 which may be used for a double hook HH. The body 45f, which may be wider than the bodies heretofore described, is molded upon the double hook at the connective crotch 60 between the two hooks. The upper portion of the body includes a passageway 47f and a side opening 55f which is essentially the same as shown at FIG. 9. This hook is thus connected to the end of a snell as heretofore described. A treble hook, not shown, may be provided by a construction which is similar to the connector C6, that is, by molding a body about the compound shank of a treble hook.

FIG. 17 shows a seventh modified embodiment of a connector C7, also for a double hook, but this construction uses a pair of single hooks H, formed essentially the same as hereinbefore described. As such, each hook H includes a barbed point 40 and a shank 41. The connector C7 is formed as a triangular body 45g with a passageway 47g extending therethrough, from an apex point to the center of the base, and with a socket-like opening 61 at the base, similar to socket 46, to receive a knot 49 tied in a snell S. The shank 41 of each hook H is fitted in an angled socket 46g as illustrated and is tightly held therein by any one of the expedients heretofore described. A treble hook, not shown, may be formed in precisely the same manner, using a modified body similar to the body 45g.

A desirable feature of the connector is the provision of a body of a strong, but resilient material such as nylon wherein a snell passageway is provided with a larger socket at its base. This provides a structure wherethrough the end of a snell, or leader, may be threaded and knotted. The snell may then be pulled back with the knot tightly fitting into the socket as described. FIGS. 18–38 show further variations of connectors of various sorts using this basic arrangement, but with differing constructions of hook shank attachments.

Figures 18, 19, 20, 21, 22, 23, 24, 25, 25A, 38:
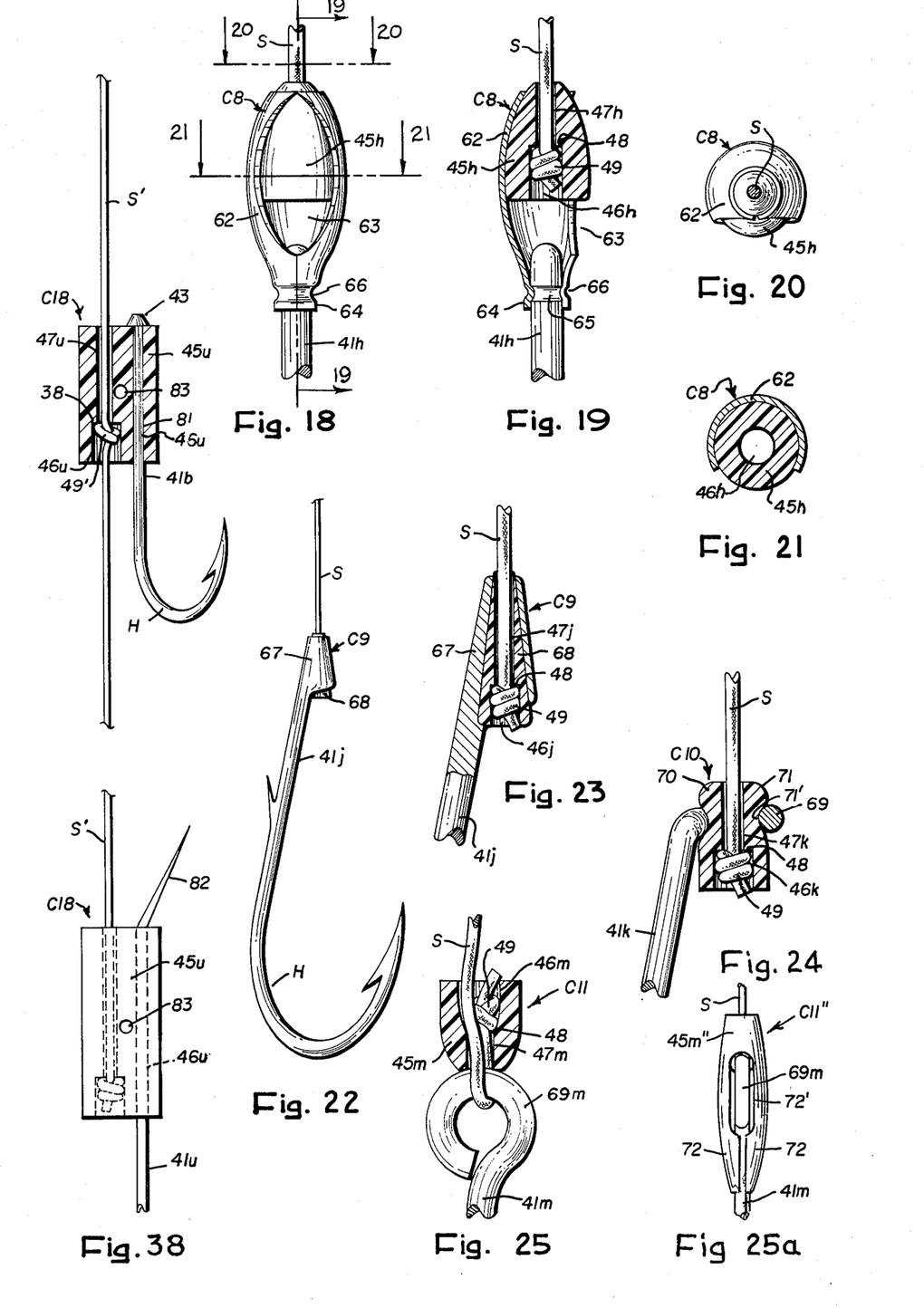
FIG. 18 shows an eighth modified construction of a hook connector wherein a portion of the connector body is formed as a metal bead.
FIG. 19 is a sectional view as taken from the indicated line 19—19 at FIG. 18.
FIG. 20 is a sectional view as taken from the indicated line 20—20 at FIG. 18.
FIG. 21 is a sectional view as taken from the indicated line 21—21 at FIG. 18.
FIG. 22 shows a ninth modified construction of a hook connector wherein the hook shank is formed as a retainer to receive the connector.
FIG. 23 is a sectional detail of the structure shown at FIG. 22, but on an enlarged scale.
FIG. 24 is a sectional view of a tenth modified construction of a hook connector which fits in the eye of a conventional hook.
FIG. 25 is a sectional view of an eleventh modified construction of a hook connector which cooperates with the eye of a hook to hold a snell.
FIG. 25a shows a construction of a hook connector similar to that shown at FIG. 25 but with side skirts at the base of the connector to overlay the eye and the shank of the hook adjacent to the eye.
FIG. 38 shows an eighteenth modified construction of a hook connector wherein a tandem hook arrangement of connectors is used with one connector being illustrated in section and the other being illustrated in full but with broken lines depicting passageways and parts hidden from view.

FIGS. 18–21 show an eighth modified embodiment of a connector C8, which is formed with a plastic body 45h within a metal shell. The body 45h is formed as a half of the body of the FIG. 2 unit. It includes a passageway 47h, a short socket 46h at the base of the body and a shoulder 48 between the two as illustrated at FIG. 19. A metal, bead-like shell 62 is formed about this unit, the proportions of which are such that an opening 63 is left at one side of the bead so that a snell may be threaded through the passageway 47h and from the opening 63 to be knotted. Once the knot is tied, it is then pulled into the socket 46h as shown at FIG. 19.

The lower portion of this shell 62 is formed as a neck 64 which embraces the end of a hook shank 41h. An annular groove 65 is formed in this hook shank 41h at the portion embraced by the neck 64 and a corresponding annular inset 66 is formed in this neck 64 to fit into the groove 65 to tightly hold the connector in place upon the hook shank. This connection of the neck to the hook shank may be by a press fit, or it may be permanently fixed as by welding. The connection may also be loose, the neck 64 being larger than the shank 41g but with the annular inset 66 being enlarged to fit into the groove 65 with a loose swiveled fit. In this arrangement, the shank could carry constructions other than a hook.

FIGS. 22 and 23 show a ninth modified embodiment of a connector C9. In this embodiment, the hook shank 41j has its end forged into an elongated, tapered head 67 with a correspondingly tapered socket 68 through it. The resilient connector C9, formed of nylon or like material, is shaped to snugly fit within this tapered socket 68 and the connector is provided with a passageway 47j having an enlarged socket 46j at its base and a shoulder 48 between the passageway and socket. The passageway 47j is proportioned to permit the end of a snell S to be extended through it so that a knot 49 may be tied at the end of this snell and pulled into the socket 46j to tightly bear against the shoulder 48 as best illustrated at FIG. 23.

FIG. 24 shows a tenth modified embodiment of a connector C10. In this embodiment, the hook shank 41k includes a conventional eye 69 which is turned out of alignment with respect to the shank about 80°. The body 70 of the connector C10 is formed as a cylindrical member slightly larger than the inside diameter of the hook eye 69 with one end being rounded as at 71. An annular groove 72, having substantially the same diameter as the inside diameter of the hook eye 69, is adjacent to this rounded end 71. Accordingly, responsive to moderate pressure, this connector C10 can be pushed against and snapped into the hook eye 69 as best illustrated in the drawing. This connector includes a passageway 47k, a socket 46k at its base and a shoulder 48 between the passageway and socket. The end of a snell S may be extended through this passageway and then tied into a knot 49. The snell may then be pulled back so that the knotted end 49 will fit tightly within the socket 46k and against the shoulder 48. It follows that this unit, though tiny when small hooks are used, is nevertheless a very effective means of connecting the snell to the hook shank.

FIGS. 25 and 25a show an eleventh modified embodiment of a connector C11. In this connector, the hook shank 41n includes an eye 69m at the end of the shank. The connectors C11 and C11″ are formed as cup-shaped bodies 45m and 45m″ which are somewhat similar to the body 45h of FIG. 19 but they are inverted as will be described. As shown in FIG. 25, passageway 47m extends into one end of body 45m to merge with a socket 46m at its enlarged end and a shoulder 48 lies at the juncture of the passageway 47m and the socket 46m. The diameter of the passageway 47m is sufficient to permit the snell S to be threaded into and out of the connector C11, for such is the manner of attaching the snell to the hook eye. The first step of attachment is to thread the snell through the connector to extend the end of the snell from the passageway end of the connector. Then the snell end is looped about the hook eye or shank and threaded back through the connector. A knot 49 is then tied in the end of the snell and this knot is pulled into the socket 46m as the snell loops tightly about the hook eye. The connector C11, FIG. 25a, is constructed the same as connector C11, excepting that opposing skirts 72 extend from the body C11″ to embrace the hook eye 69m and shank 41m. The skirts 72 will include a spaced portion 72′ at the eye of the hook to provide clearance for the snell when it is wrapped about the hook eye and/or the shank. The skirts 72 will better permit bait to be threaded upon the hook without being disrupted by the hook eye.

Figure 26:
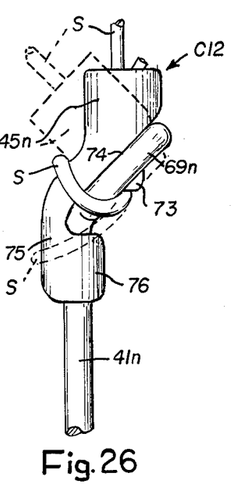
FIG. 26 shows a twelfth modified construction of a hook connector wherein the connector embraces the eye and the upper portion of a hook shank when securing the end of a snell to the hook, and with broken lines showing an alternate position of portions of the connector.
Figure 27:
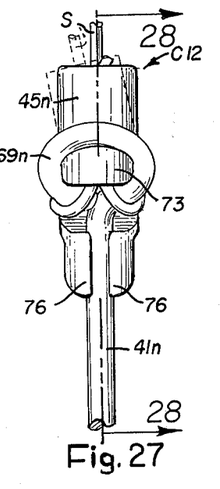
FIG. 27 is a side view of the structure shown at FIG. 26, with broken lines showing an alternate position of portions of the connector.
Figure 28:
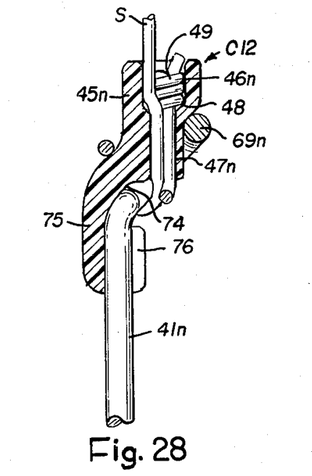
FIG. 28 is a sectional view as taken from the indicated line 28—28 at FIG. 27.

FIGS. 26, 27 and 28 show a twelfth modified embodiment of a connector C12. This connector may be used with a hook having an eye 69n which is angled with respect to the shank 41n. The connector is formed with a body 45n which is similar to the body of the embodiment C11 in that the passageway 47n and socket 46n are arranged for threading the end of a snell S into and out of the socket and passageway to loop about this hook. However, this body 45n is adapted to set upon the eye 69n of the hook with a stub portion 73 extending through the eye. The base 74 of the body, adjacent to the stub, is angled to align the passageway 47n and the socket 46n in parallelism with axis of the shank 41n when seated upon the eye. To complete this unit, an offset arm 75 extends from the base portion 74, adjacent to the hook eye, to lie against the hook shank at the eye and to turn in the direction of, and to lie alongside the shank 41n. This arm 75 includes opposing gripping fingers 76 which are resilient and resiliently grip the shank 41n to snap onto the hook as illustrated.

It is sometimes desirable to incline the shank of the hook with respect to the snell to obtain an arrangement such as illustrated at FIG. 11. Such an inclination provides for a more effective directional pull of the hook. This inclination is easily obtained by modifying the connector C12 to a form indicated in broken lines at FIG. 26. The angling of this connector can also be shifted to change the angle at which the hook is pulled, not only in the direction indicated in broken lines at FIG. 26, but also sidewise as indicated in broken lines at FIG. 27.

The snell S is attached to this connector by threading the snell end through the socket 46n and passageway 47n and at the same time through the hook eye 69n. This snell end is then wrapped about the shank of the hook and the arm 75 in a symmetrical manner as shown at FIGS. 26 and 27, either at the full line position shown, or at other positions such as the dotted line position shown at FIG. 26. Next, the end of the snell is then extended back through the passageway 47n and socket 46n. This end is then knotted, as at 49, and the knot is pulled into the socket 46n and against the seat 48 as shown at FIG. 28. An advantage of this arrangement resides in the fact that the wrap of the snell about the hook and arm 76 keeps the snell away from any sharp edges and disperses the pull tension over an extended or longer portion of the snell, eliminating concentrated stress points.

Figures 29, 30, 31, 32, 33, 34, 35, 36, 37:
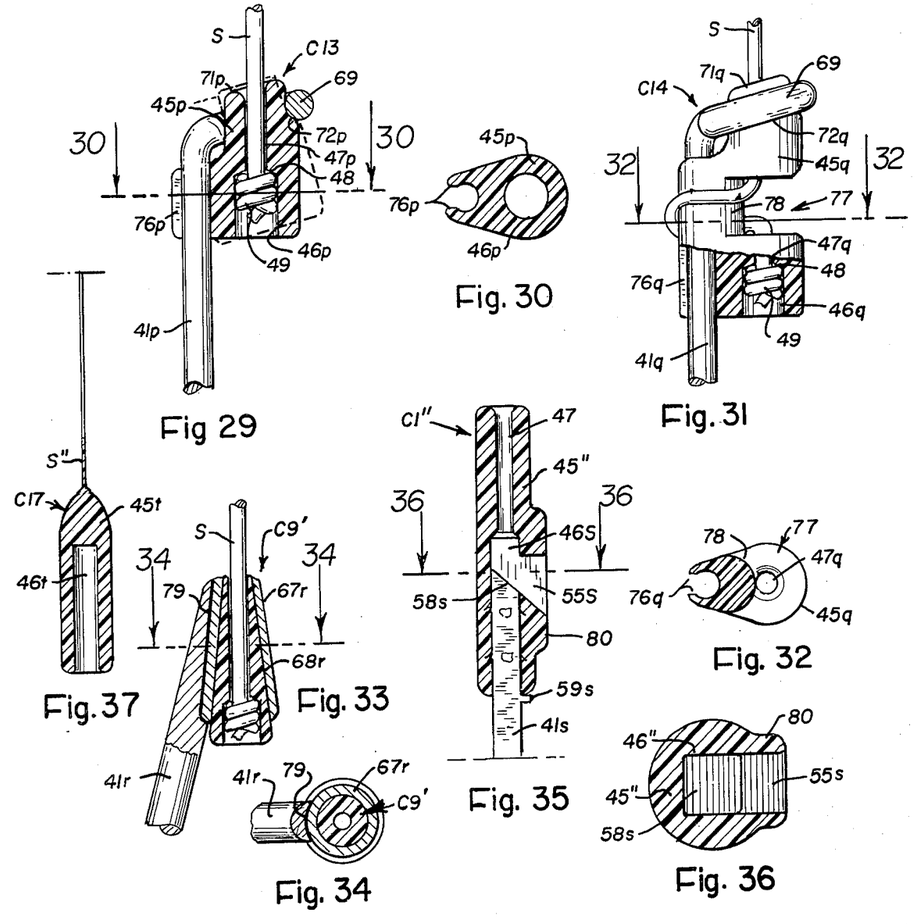
FIG. 29 is a sectional view of a thirteenth modified construction of a hook connector which is similar to the FIG. 24 construction, with broken lines showing an alternate position of portions of the connector.
FIG. 30 is a sectional view of the connector per se as taken from the indicated line 30—30 at FIG. 29.
FIG. 31 is a view, partly in section, of a fourteenth modified construction of a hook connector which is similar to the FIG. 24 construction.
FIG. 32 is a sectional view as taken from the indicated line 32—32 at FIG. 31.
FIG. 33 is a sectional view of a fifteenth modified construction of a hook connector, similar to the FIG. 23 construction.
FIG. 34 is a sectional view as taken from the indicated line 34—34 at FIG. 33.
FIG. 35 is a sectional view of a sixteenth modified construction of a hook connector, similar to the FIG. 15 construction.
FIG. 36 is a sectional view as taken from the indicated line 36—36 at FIG. 35, but on an enlarged scale.
FIG. 37 is a sectional view of a seventeenth modified construction of a hook connector which has a snell reach formed integrally with the hook connector.

FIGS. 29 and 30 show a thirteenth modified embodiment of a connector C13. This connector is for use for hooks having an eye 69 angled with respect to the hook shank 41p. The connector C12 is similar to the connector C10 shown at FIG. 24. A rounded reduced diameter end 71p of this connector extends through the hook eye 69, while a shoulder 72p holds the body 45p against the hook eye. The passageway 47p, the socket 46p and the seat 48 between the passageway and socket are the same as heretofore described, and also, the snell S is attached to the connector by a knot 49 as heretofore described. However, this connector, in contrast with the connector of FIG. 24, has a pair of opposing fingers 76p which outstand from the side of the body to resiliently grip the hook shank to hold the same in place as illustrated. This provides a snap-on convenience.

FIGS. 31 and 32 show a fourteenth modified embodiment of a connector C14. This connector is similar to the connector C13 and includes a reduced diameter end 71q to extend through a hook eye 69, a shoulder 72q to hold the body 45q against the hook eye, and opposing fingers 76q at the side of the body to connect with the hook shank as previously described. However, the body section 45q is interrupted by a central notch 77 and the snell passageway 47q extending through this body at the hook eye end, is also interrupted by the notch 77. The sides of the body 45q are rounded at this notch, as at 78, so that the end of a snell S threaded through the connector passageway 47a may be extended from the notch and wrapped about the body one or more wraps as illustrated. The snell is then threaded into the passageway and through the socket 469 at the base of the connector. It is then secured in place by a knot 49 as illustrated. The wraps of the snell about the body, at the notch, permits the snell to resist a stronger pull than it could otherwise resist if the pulling were directly against the knot 49.

FIGS. 33 and 34 show a fifteenth modified embodiment of a connector C9' which is essentially the same as the connector for C9 shown at FIGS. 22 and 23 and thus, it need not be described in detail. However, in this embodiment C9', a tapered shell 67r having a tapered socket 68r is provided, which is welded onto the end of a hook shank 41r as at the juncture 79 between the two members. This juncture 79 may be formed in the hook shank by forging or machining the shank. This mode of manufacturing the unit will produce a stronger connection than that shown at FIGS. 22 and 23.

FIGS. 35 and 36 show a sixteenth modified embodiment of a connector C1'', which is similar to the connector C1' shown at FIG. 15, although the body 45'' of the connector C1'' is shown as an elongated, cylindrical member. A passageway 47 extends to a squared socket 46s wherein a square-formed hook shank 41s is fitted. A side opening 55s is provided in this unit and the end of the hook shank is sloped as at 58s to facilitate guiding the end of a snell from the passageway 47 and through a side opening. A stop 59s on the hook shank permits it to be properly positioned as to depth within the connector as hereinbefore described. One modification over the FIG. 15 construction resides in forming a boss 80 about the opening to increase the strength of the connector at this opening. The manner in which a snell is threaded onto the connector and locked into position is the same as hereinbefore described. As shown in FIG. 36, the square socket 46'' receives the squared hook shank for the purpose of aligning the angled hook shank 58s to the opening 55s.

FIG. 37 shows a seventeenth modified embodiment of a connector C17. In this connector, the body 45t is a cylindrical member having a shank socket 46t at its base to receive a hook shank 41. The body is molded integrally with a snell S'' at the opposite end of the body to provide a structure of extreme simplicity.

FIG. 38 shows an eighteenth modified embodiment of a connector C18 which may be used with tandem or gang hooks. Thus, two block-like connectors C18 are shown to better depict this tandem arrangement of the hooks. The connector C18, as shown in section, is a block-like member and is provided with a passageway 47u which extends longitudinally through the connector block. A socket 46u is provided in the block at the base end of the passageway and a shoulder 38 is between the passageways 47u and 46u to receive a snell S', which may be threaded completely through the block and extended beyond the block any desired distance. When properly positioned, a knot 49' may be tied in the snell S' and pulled into the socket to tightly hold the unit in place on the line. The hook H is provided with a shank 41b having an enlarged head 43 as heretofore described, and this hook shank 41b may be extended completely through a passageway 81 in the block which parallels the passageway 47. The head 43 at the opposite side of the block holds the hook in place.

The connector C18, which is shown in full at FIG. 38, connects with the snell S' and it includes a passageway 47u and a socket 46u shown in dotted lines to indicate the manner in which the snell is attached to the connector, as heretofore described. A hook shank 41u is also fitted into a socket 36u, as shown in broken lines in the drawing, and this hook shank includes a spur 82 at the end opposite the hook. This spur is used on minnow hooks for holding bait. As a further feature, the blocks C18 may include a hole 83 for threading a wire or line therethrough to facilitate tying bait in place.

I have now described my invention in considerable detail. However, it is obvious that others skilled in the art can build and devise alternate and equivalent constructions which are nevertheless within the spirit and scope of my invention. Hence, I desire that my protection be limited, not by the constructions illustrated and described, but only by the proper scope of the appended claims.

I claim

1. A hook connector for attaching a snell onto the shank of the hook, comprising:
    a body of a resilient synthetic resin material having a passageway therethrough which is sized to receive the snell;
    and an enlarged snell-knot socket at the end of the passageway within the body, whereinto the end of a snell extends from the passageway and is knotted to secure the same in place with the snell knot tightly fitting into the snell-knot socket;
    a socket extending into the connector which is proportioned to receive the hook shank, the bottom of said hook shank socket forming said snell-knot socket, said connector further including a side opening in the body near the bottom of said hook shank socket, said hook shank extending into its socket to a position adjacent said side opening with the end of said hook shank being angled toward said side opening to facilitate guiding a snell from the side opening which is threaded into the passageway from the end of the connector.

2. A connector comprising in combination with a fishing line;
    a rod-like connecting member constructed of resilient, slightly stretchable material and having at least a first axial passageway extending into it from one end, and a side opening intersecting said first passageway;

said first passageway being slightly larger in cross section than the diameter of the fishing line to receive the same;

the other end of said member being coupled to a fish handling implement to be joined with said fishing line through said member;

said first passageway extending to the side opening with the width of the side opening being at least as great as the diameter of the said first passageway but not exceeding the diameter of a knotted end of said line, said side opening defining gripping means whereby the end of said line may be threaded into the first passageway, extended from the side opening, knotted and then pulled back into the side opening with the knotted end being forced into the side opening with a slight stretching of the resilient connector about the knotted end to thus effect a tight fit and a gripping of the knotted end of said line.

3. A connector as defined in claim 2, wherein said fish handling implement joined to said other end of the connector is disposed in a second axial passageway extending into said other end.

4. A connector as defined in claim 3, wherein said fish handling implement is the shank of a fishing hook, said shank being securely held in said second passageway by holding means.

* * * * *